United States Patent Office 2,833,829
Patented May 6, 1958

2,833,829

PHENOL AND THIOPHENOL METHYLENE ALKYL ETHERS

Gerhard Schrader, Opladen, Germany, assignor to Farbenfabriken Bayer Aktiengesellschaft, Leverkusen, Germany, a corporation of Germany No Drawing. Application March 10, 1954
Serial No. 415,443

Claims priority, application Germany March 16, 1953

7 Claims. (Cl. 260—609)

This invention relates to new insecticides and to a process of making same.

In accordance with the invention it has been found that phenol and thiophenol methylene alkylethers of the general formula

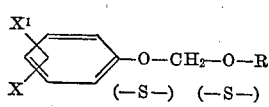

where R stands for an alkyl radical, X is chlorine and $X^1$ is hydrogen or chlorine, are very effective insecticides.

The new compounds are easily obtainable from phenols or thiophenols which are substituted in the aromatic nucleus by at least one chlorine atom, by condensation with halogeno methyl ethers or halogeno methyl thioethers in the presence of acid binding agents. The reaction is preferably carried out at elevated temperature in a suitable solvent and yields methylene ethers of the above formula even when the phenol or the thiophenol component is applied in excess. This result is most surprising since in many reactions of the halogeno methyl ethers in addition to the halogen atom the ether-group is replaced by other groups.

The new compounds are liquids which can be distilled at reduced pressure without decomposition. They are distinguished by outstanding insecticidal properties.

The invention is further illustrated by the following examples without being restricted thereto.

Example 1

49 grams of 2,4-dichlorophenol are dissolved in 200 cc. of methyl ethyl ketone. 45 grams of pulverised potassium carbonate are added to the solution with stirring. 29 grams of chloro methyl ethyl ether (B. P.: 82–83° C. at a pressure of 760 mm. Hg) are introduced into the suspension dropwise at 70° C. while continuously stirring. The temperature is maintained at 70° C. for another hour and the resulting salts are filtered off with suction. The solvent is evaporated from the filtrate in vacuum. The residue is heated to 70° C. at a pressure of 2 mm. Hg 15 grams of the new ether of the following formula

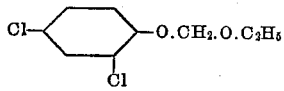

B. P.: 107° C. at a pressure of 0.05 mm. Hg are obtained.
An 0.1% aqueous solution of the ether kills plant-lice to 100%.

Example 2

45 grams of 4-chlorothiophenol are dissolved in 350 cc. of methyl ethyl ketone. 45 grams of potassium carbonate are added to the solution which is heated to 70° C. At this temperature 33 grams of chloromethyl-thioethyl-ether are run in within 30 minutes and the solution is kept at 70° C. for another hour. After filtering off the salts the solvent is distilled off from the filtrate. The residue is kept at 50–60° C. at a pressure of 2 mm. Hg 54 grams of the ether having the formula

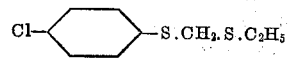

B. P.: 99–100° C. at a pressure of 0.05 mm. Hg are obtained.

Example 3

38.5 grams of 4-chlorophenol are dissolved in 200 cc. of methyl ethyl ketone. 45 grams of dried and sifted potassium carbonate are added to the solution into which 33 grams of chloromethyl thioethyl ether are introduced at 70° C. dropwise with good stirring. The temperature is kept at 70° C. for another hour, the reaction product filtered with suction and worked up as described in the preceding example. 50 grams of the ether having the formula

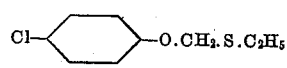

B. P.: 137° C. at a pressure of 2 mm. Hg are obtained.
An 0.01% aqueous solution of this compound kills plant-lice safely.

Example 4

44 grams of 4-chlorothiophenol are dissolved in 200 cc. of methyl ethyl ketone. 45 grams of dried potassium carbonate are added to the solution which is heated to 70° C. with vigorous stirring. After adding 30 grams of chloromethyl ethyl ether an exothermic reaction occurs. After 2 hours the mixture may be worked up. 40 grams of the ether having the formula

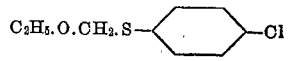

B. P.: 107° C. at a pressure of 2 mm. Hg are obtained.
An 0.1% solution of this compound kills plant-lice safely to 100%.

Example 5

50 grams of 2,4-dichlorophenol are dissolved in 300 cc. of methyl ethyl ketone. 45 grams of dried and sifted potassium carbonate are added to the suspension. At 70° C. 34 grams of chloromethyl thioethyl ether are added dropwise to the suspension which is kept at 70° C. for a further 30 minutes. After working up as described in the preceding examples, 60 grams of the ether of the formula

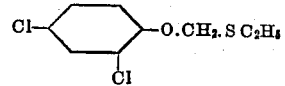

B. P.: 126° C. at a pressure of 0.5 mm. Hg are obtained.
An 0.01% aqueous solution of this ether kills plant-lice to 100%.

I claim:

1. A compound having the formula

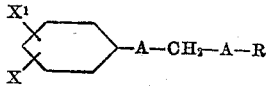

in which X is chlorine, $X^1$ is a member selected from the group consisting of hydrogen and chlorine, A is a member selected from the group consisting of oxygen and sulfur and R is a lower alkyl radical having from 1–4 carbon atoms.

2. A compound having the formula

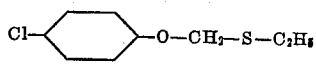

3. A process for the production of phenol and thiophenol methylene alkyl ethers which comprises reacting a chlorophenol having the formula

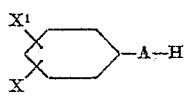

in which X is chlorine, $X^1$ is a member selected from the group consisting of hydrogen and chlorine with a halogeno methyl alkyl ether having the formula $$Hal—CH_2—A—R$$

in which A is a member selected from the group consisting of oxygen and sulfur and R is a lower alkyl radical having from 1–4 carbon atoms in the presence of an acid-binding agent.

4. A compound having the formula

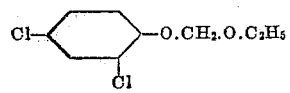

5. A compound having the formula

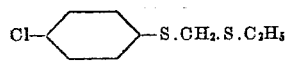

6. A compound having the formula

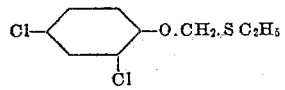

7. A compound having the formula

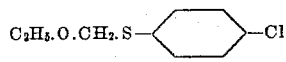

References Cited in the file of this patent
UNITED STATES PATENTS

| | | |
|---|---|---|
| 2,205,392 | Coleman et al. | June 25, 1940 |
| 2,352,078 | Coleman et al. | June 20, 1944 |
| 2,463,541 | Houk | Mar. 8, 1949 |